(No Model.)
E. A. BROWNFIELD.
COVER FOR JUGS.
No. 374,238. Patented Dec. 6, 1887.
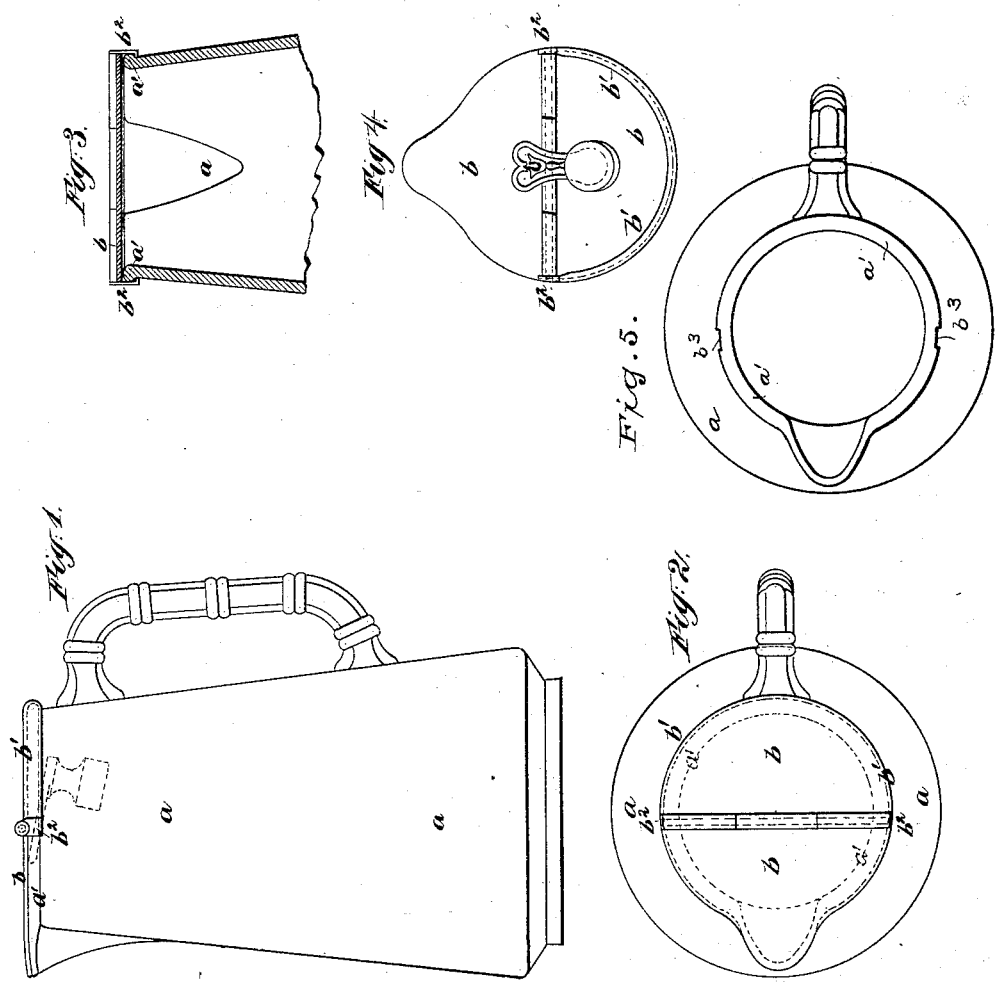
Witnesses:
Charles R. Searle
M. F. Boyle
Inventor:
Edward Arthur Brownfield
by his attorney
Thomas Drew Stetson

UNITED STATES PATENT OFFICE.

EDWARD ARTHUR BROWNFIELD, OF HARTWELL HALL, BARLASTON, COUNTY OF STAFFORD, ENGLAND.

COVER FOR JUGS.

SPECIFICATION forming part of Letters Patent No. 374,238, dated December 6, 1887.

Application filed October 11, 1886. Serial No. 215,851. (No model.) Patented in England June 10, 1885, No. 7,075.

*To all whom it may concern:*

Be it known that I, EDWARD ARTHUR BROWNFIELD, a subject of the Queen of Great Britain, residing at Hartwell Hall, Barlaston, in the county of Stafford, England, have invented a certain new and useful Improvement in Covers for Jugs and other Vessels, of which the following is a specification.

My invention may apply to jars, pails, and a great variety of vessels of various names. I will describe it as applied to a jug or pitcher for table use.

The invention has for its object an improved construction of parts by which the cover can be held in its position when in use and readily taken off for cleaning and other purposes without any part of the cover being permanently fastened to the jug.

The accompanying drawings form a part of this specification and represent what I consider the best means of carrying out the invention.

Figure 1 is an elevation, and Fig. 2 is a plan, of a jug, showing my invention applied thereto. Fig. 3 is a vertical section of the upper part of the jug and its cover, and Fig. 4 is an under side view of the cover detached. Fig. 5 is a plan view of the jug, showing the indents in the rim thereof.

Similar letters of reference indicate corresponding parts in all the figures where they occur.

In the drawings, $a$ represents the body of the jug, and $b$ the cover thereof, which latter, according to my invention, can be held in its position on the jug when in use and readily taken off for cleaning and other purposes without any part of the cover being permanently fastened to the jug.

The only alteration in the jug to which this improved cover has to be applied is a prominent rim, $a'$. A correspondingly-formed rim, $b'$, around part of the cover $b$ fits under the rim $a'$ of the jug, and the cover $b$ is thereby prevented from slipping either forward or upward. In order to prevent the cover from slipping backward, two springs, $b^2$—one on each side of the cover—are so placed near the ends of the hinge of the cover as to press tightly against the jug, and by engaging strongly under the rim $a'$ hold the cover $b$ in position.

This invention is applicable not alone to plain covers, but also to swing or self-balancing covers—that is, when a jug or vessel is tilted in the direction for pouring, the cover, or, in some cases, part of the cover, raises itself and returns to its usual position when the jug or vessel is again placed upright. I have shown it as so applied.

In the drawings I have represented the springs $b^2$ as fastened perpendicularly to the hinge or rim of the cover; but they may form part of the rim of the cover, which in such case should be made of metal sufficiently elastic to enable the ends near the hinges of the cover to act as springs and to press with sufficient force to secure the fastening of the cover in position.

In some cases, in order to retain the cover in correct relation with the top of the jug or other vessel, I make slight indents $b^3$ in the rim of the jug, as will be well understood, and cause the springs $b^2$ to snap into the same. In the arrangement above described the cover is placed in position on the jug by sliding it thereon from the back, and when it has reached the proper position the springs $b^2$ snap into the indents $b^3$ in the upper edge of the vessel $a$, and thus retain the cover in place.

In the drawings I have represented the jug to be fitted with a hinged balanced cover; but hinged unbalanced covers may be used in carrying my invention into effect.

I claim as my invention—

The combination, with the vessel $a$, having the outwardly-projecting rim $a'$ around its upper edge, said rim being provided with indents $b^3$ at each side of the top of the vessel, of the cover $b$, comprising two sections hinged together, one of said sections having a rim, $b'$, adapted to engage said rim on the vessel, and two springs, $b^2$, adapted to engage said indents in the rim on the vessel, as and for the purpose described.

In testimony whereof I have hereunto set my hand, at Cobridge, in the county of Stafford, England, this 13th day of September, 1886, in the presence of two subscribing witnesses.

EDWARD ARTHUR BROWNFIELD.

Witnesses:
   W. A. COWLISHAW,
   A. J. HENSTOCK, *Solr.*,
*Clerks to Messrs. Paddock & Sons, Solrs., Hanley.*